(12) United States Patent
Renstrom (10) Patent No.: US 6,493,817 B1
(45) Date of Patent: Dec. 10, 2002

(54) FLOATING-POINT UNIT WHICH UTILIZES STANDARD MAC UNITS FOR PERFORMING SIMD OPERATIONS

(75) Inventor: Preston J. Renstrom, Bloomington, MN (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/316,340

(22) Filed: May 21, 1999

(51) Int. Cl.[7] .............................................. G06F 9/302
(52) U.S. Cl. ...................... 712/22; 708/501; 708/523; 708/524; 712/222
(58) Field of Search ................................. 708/523, 574, 708/501, 524; 712/22, 222

(56) References Cited

U.S. PATENT DOCUMENTS

| | | | | |
|---|---|---|---|---|
| 5,778,241 A | * | 7/1998 | Bindloss et al. ............... | 712/20 |
| 6,205,462 B1 | * | 3/2001 | Wyland et al. .............. | 708/503 |
| 6,292,886 B1 | * | 9/2001 | Makineni et al. ........... | 712/222 |
| 6,298,366 B1 | * | 10/2001 | Gatherer et al. ............ | 708/523 |

* cited by examiner

Primary Examiner—Kenneth S. Kim (57) ABSTRACT

The present invention provides a method and apparatus for performing floating-point operations. The apparatus of the present invention comprises a floating point unit which comprises standard multiply accumulate units (MACs) which are capable of performing multiply accumulate operations on a plurality of data type formats. The standard MACs are configured to operate on traditional data type formats and on single instruction multiple data (SIMD) type formats. Therefore, dedicated SIMD MAC units are not needed, thus allowing a significant savings in die area to be realized. When a SIMD instruction is to be operated on by one of the MAC units, the data is presented to the upper and lower MAC units as 64-bit words. Each MAC unit also receives one or more bits which cause the MAC units to each select either the upper or lower halves of the 64-bit words. Each MAC unit then operates on its respective 32-bit words. The results of the operations performed by the MAC units are then coalesced by the bypass blocks of the floating-point unit into a 64-bit word. The results are coalesced in such a manner that the results appear identical to the results obtained in floating-point units which utilize dedicated SIMD hardware.

16 Claims, 4 Drawing Sheets

FLOATING-POINT UNIT WHICH UTILIZES STANDARD MAC UNITS FOR PERFORMING SIMD OPERATIONS

TECHNICAL FIELD OF THE INVENTION

The present invention relates to a floating-point unit and, more particularly, to a floating-point unit that is capable of utilizing standard MAC units for performing operations on traditional data type formats and on SIMD data type formats.

BACKGROUND OF THE INVENTION

As processor speeds and data sizes increase, a critical bottleneck in computation performance for floating-point operations exists with respect to the amount of data that can be brought into the floating-point unit at any one time. With the evolution of processor architectures to 64-bit architectures and greater, the impact of this bottleneck can only be reduced by either utilizing more data load ports, and thus more load bandwidth, or by dividing the 64-bit data into smaller pieces and performing multiple operations on these smaller pieces. This later technique is particularly useful for performing many small operations that do not require precision as great as one 64-bit floating-point number, which is referred to in the Institute of Electrical and Electronics Engineers (IEEE) floating-point form standard as a double word. For example, in typical graphics display operations, floating-point operations are computationally intensive, but do not require the range that a 64-bit number is capable of representing. Therefore, this later method of dividing the data into smaller pieces and operating on these smaller pieces can be used advantageously in this type of environment.

Some known architectures that are designed to implement this technique utilize what is commonly referred to as single instruction, multiple data (SIMD) operations. A SIMD instruction causes identical operations to be performed on multiple pieces of data at the same time, i.e., in parallel. Storing smaller pieces of data in one larger register is a more efficient use of die area than storing the smaller pieces of data in a plurality of smaller registers. Therefore, SIMD operations are normally performed on the smaller data pieces in a single, larger register simultaneously. Also, it is necessary to perform the SIMD operations on the smaller data pieces at the same time in order to meet the requirements of SIMD operations.

Processor architectures are currently being designed to support both traditional and SIMD type data formats. Traditional data type formats typically have wider bit sizes than SIMD data type formats. In order to support both of these types of operations, SIMD and standard functional units have been implemented in these architectures for processing traditional and SIMD data type formats. These functional units, one type of which is commonly referred to as multiply accumulate (MAC) blocks, perform various types of arithmetic functions, such as, for example, adds, subtracts and multiplies on the data presented to them. The primary reason for utilizing dedicated MACs for handling SIMD operations is that these dedicated MACs are capable of simultaneously performing two SIMD operations. However, implementing these dedicated SIMD MACs in a floating-point unit is costly in terms of the amount of additional die area consumed by the SIMD MACs. Furthermore, since SIMD operations typically represent approximately less than five percent of all operations performed by the floating-point unit, the tradeoff of die area for processing throughput is expensive.

Accordingly, a need exists for a floating-point unit which is capable of operating on multiple data type formats and which does not require dedicated hardware for each of the different data type formats.

SUMMARY OF THE INVENTION

The present invention provides a method and apparatus for performing floating-point operations. The apparatus of the present invention comprises a floating point unit which comprises two standard multiply accumulate units (MACs) which are capable of performing multiply accumulate operations on a plurality of data type formats. The standard MACs are configured to operate on traditional data type formats and on single instruction multiple data (SIMD) type formats. Therefore, dedicated SIMD MAC units are not needed, thus allowing a significant savings in die area to be realized.

In accordance with the present invention, when a SIMD instruction is to be operated on by one of the MAC units, the data is presented to the upper and lower MAC units as 64-bit words. Each MAC unit also receives one or more bits which cause the MAC units to each select either the upper or lower halves of the 64-bit words, depending on the MAC unit. For example, the lower 32-bit words may be processed by the upper MAC unit and the upper 32-bit words may be processed by the lower MAC unit.

Each MAC unit operates on its respective 32-bit words. The results of the operations performed by the MAC units are then coalesced by the bypass blocks of the floating-point unit into a 64-bit word. The results are coalesced in such a manner that the results appear identical to the results obtained in floating-point units which utilize dedicated SIMD hardware.

These and other features and advantages of the present invention will become apparent from the following description, drawings and claims.

DETAILED DESCRIPTION OF THE PREFERRED EMBODIMENT

Figure 1:
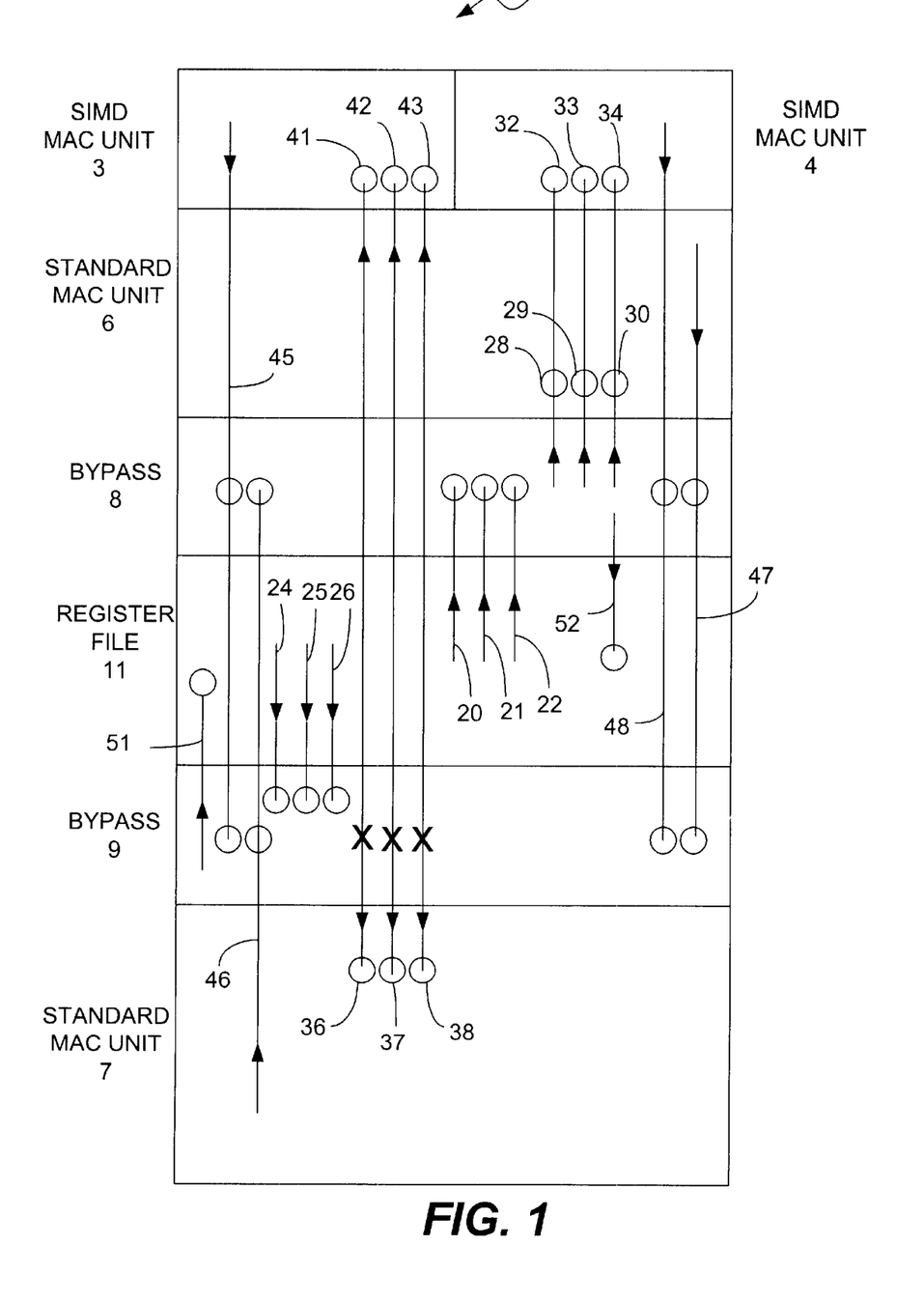
FIG. 1 is a functional block diagram of a floating-point unit which utilizes two dedicated SIMD MAC units for performing SIMD operations.
Figure 3:
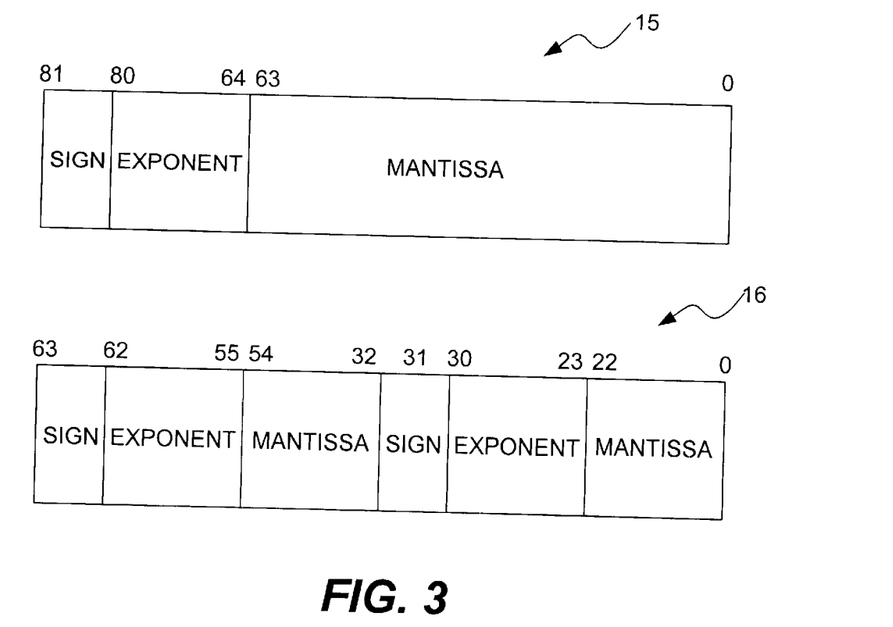
FIG. 3 illustrates the bit fields of two different data type formats that can be operated on by the floating-point unit of the present invention shown in FIG. 2.

FIG. 1 is a functional block diagram of a floating-point unit 1 which is capable of operating on traditional data type formats and on an SIMD data type formats. The floating-point unit 1 comprises two SIMD MAC units 3 and 4, two standard MAC units 6 and 7, two bypass blocks 8 and 9 and a register file block 11. The standard MAC units 6 and 7 perform floating-point operations on traditional data type formats. The SIMD MAC units 3 and 4 perform mathematical operations on SIMD data type formats. Therefore, the floating-point unit 1 shown in FIG. 1 has dedicated SIMD MAC units 3 and 4 which perform SIMD operations and standard MAC units 6 and 7 which perform operations on standard, or traditional, data type formats. These two data type formats are shown in FIG. 3. A typical data type format 15 to be operated on comprises a 64-bit mantissa value, a 17-bit exponent value and a 1-bit sign value. In contrast, a SIMD data type format 16 comprises two 23-bit mantissa values, two 8-bit exponent values (i.e., one associated with each of the mantissa values), and two sign bits (i.e., one bit associated with each mantissa value and its exponent). The SIMD data type format is well known in the art and are documented in the IEEE standards for floating-point operations. The manner in which operations are performed on these data type formats is also well known in the art. Therefore, a detailed discussion of these floating-point data type operations will not be provided herein in the interest of brevity.

In the floating-point unit 1 shown in FIG. 1, each of the standard MAC units 6 and 7 are capable of performing a multiply accumulate operation. When a multiply accumulate operation is to be performed on the typical data type format 15 shown in FIG. 3, the operands A, B and C are delivered to the bypass blocks 8 and 9. Since the floating-point unit 1 comprises two standard MAC units 6 and 7, two multiply accumulate operations can be performed simultaneously (i.e., one multiply accumulate operation is performed in standard MAC unit 6 and the other is performed in standard MAC unit 7).

Each of the standard MAC units 6 and 7 comprises one 82-bit adder and one 82-bit multiplier. The operands to be operated on are received by the register file block 11 from an instruction decoder (not shown) comprised by the processor architecture. The instruction decoder provides control bits to the register file block 11 along with the operands and these control bits are utilized by the MAC units to determine the type of arithmetic operation to be performed on the operands, e.g., adds, subtracts, multiplies, etc. The register file block 11 comprises a plurality of registers in which the operands received by the register file block 11 are stored.

The control bits received by the register file block 11 indicate which registers in the register file block 11 are to be utilized for reading and writing the operands. Each of the bypass blocks 8 and 9 handles one set of operands. The bypass blocks 8 and 9 also utilize control bits provided to them to determine which register contents are to be routed to a particular destination in the floating-point unit 1. The bypass blocks 8 and 9 perform functions which are well known in the art of processor architecture. Therefore, a detailed discussion of the functions performed by the bypass blocks 8 and 9 will not be provided herein.

After the operands have been loaded in the appropriate registers in the register file block 11, the register file block 11 reads the operands out of the appropriate registers and the register file block 11 routes them to the appropriate bypass block, as indicated by the arrows on lines 20, 21 and 22 directed from the register file block 11 to the bypass block 8. The lines 20, 21 and 22 correspond to the bus comprised in the floating-point unit 1 and each of the lines 20, 21 and 22 corresponds to a plurality of lines needed for transporting the multi-bit operands A, B and C. The circles in FIG. 1 are intended to denote bus inputs to the blocks on which they are located. The register file block 11 reads the second set of operands A, B and C out of the appropriate registers in the register file block 11 and the bypass block 9 routes them to the appropriate MAC unit, as indicated by the arrows on lines 24, 25 and 26. These lines also represent a plurality of bus lines.

The bypass block 8 delivers its set of operands, which have been read from the register file block 11, either to the standard MAC unit 6 via bus inputs 28, 29 and 30 or to the SIMD MAC unit 4 via the bus inputs 32, 33 and 34. Similarly, the bypass block 9 either delivers its set of operands to the standard MAC unit 7 via bus inputs 36, 37 and 38 or to the SIMD MAC unit 3 via bus inputs 41, 42 and 43.

In the case of the data type format 15 shown in FIG. 3, the bypass blocks 8 and 9 will provide the operands to the standard MAC units 6 and 7, respectively. Once the standard MAC units 6 and 7 have performed their respective arithmetic operations, the results are delivered by the standard MAC units 6 and 7 to the bypass blocks 8 and 9. The bypass blocks 8 and 9 pass the results of the arithmetic operations to the register file block 11 via buses 51 and 52, which then stores the results in one or more registers in the register file block 11.

Whenever an operation is to be performed by the floating-point unit 1, the control bits received by the register file block 11 indicate which registers the results of the associated operations are to be stored in once the operations have been performed. The bypass blocks 8 and 9 also receive control bits which the bypass blocks 8 and 9 utilize to determine the registers in which the results of the operations are to be stored.

Each of the SIMD MAC units 3 and 4 comprises two 32-bit adders and two 32-bit multipliers. Each SIMD MAC unit 3 and 4 is capable of processing three operands A, B and C to perform the arithmetic operation indicated by the instruction decoder. The manners in which the SIMD MAC units 3 and 4 and the standard MAC units 6 and 7 operate on the data type formats 15 and 16 shown in FIG. 3 are well-known to those skilled in the art. Therefore, a detailed discussion of the manner in which these units perform their multiply accumulate operations (i.e., A+B×C) will not be discussed herein.

Although the floating-point unit 1 is capable of processing traditional data type formats and SIMD data type formats, implementing the SIMD MAC units 3 and 4 is costly in terms of the amount of die area required for their implementation. Furthermore, SIMD operations are performed rarely and the SIMD MAC units 3 and 4 are dormant whenever traditional data type formats are being processed by the standard MAC units 6 and 7. Similarly, the standard MAC units 6 and 7 are dormant whenever SIMD operations are being performed by the SIMD MAC units 3 and 4. Therefore, the SIMD MAC units 3 and 4 and the standard MAC units 6 and 7 consume a relatively large amount of die area, even though they are not utilized for all operations.

In accordance with the present invention, a floating-point unit 50 (FIG. 2) is provided which utilizes standard MAC units 51 and 52 for performing all arithmetic operations, including operations to be performed on SIMD data type formats. Therefore, the need for the dedicated SIMD MAC units 3 and 4 shown in FIG. 1 has been eliminated, thus allowing a significant savings in the amount of die area required for the floating-point unit 50 to be realized. The standard MAC units 51 and 52 preferably are very similar to the standard MAC units 6 and 7 shown in FIG. 1. Therefore, the standard MAC units 51 and 52 preferably each comprise one 82-bit adder and one 82-bit multiplier (not shown). However, the standard MAC units 51 and 52 are each configured to receive a particular bit and to utilize this bit to cause the standard MAC units to select the appropriate half of a 64-bit word, as described below in more detail.

Figure 2:
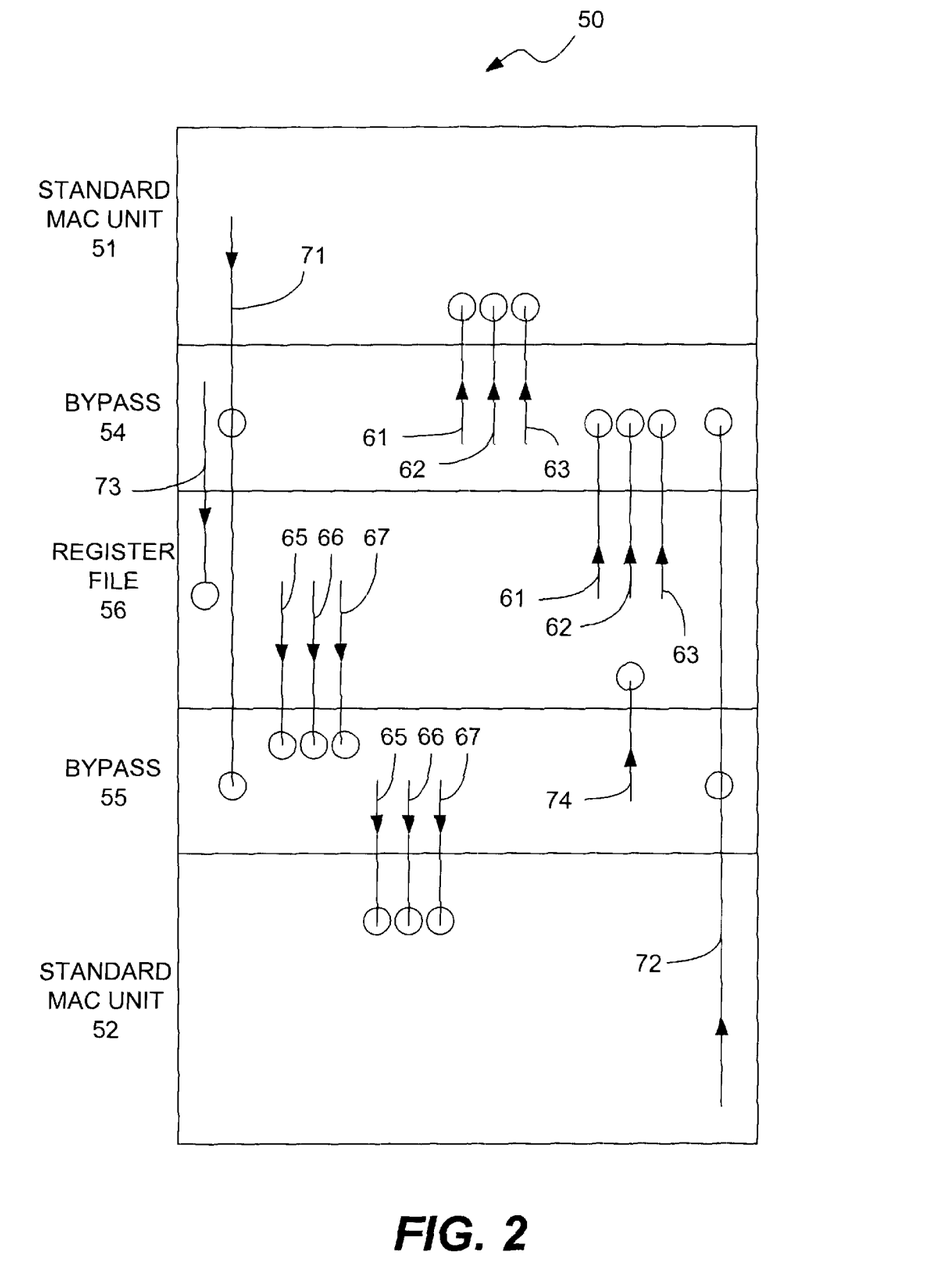
FIG. 2 is a functional block diagram of the floating-point unit of the present invention which does not utilize dedicated SIMD MAC units for performing SIMD operations, but rather, which utilizes standard MAC units for performing all of the operations needed to be performed by a floating-point unit, including SIMD operations.

When a traditional data type format 15 is to be processed by the floating-point unit 50, the standard MAC units 51 and 52 perform their normal operations. However, when a SIMD data type format 16 is to be processed by the floating-point unit 50, the SIMD bit field is split into two 32-bit words and the lower 32-bits of the SIMD word are processed by standard MAC unit 51 and the upper 32 bits of the SIMD word are processed by standard MAC unit 52. Although the entire 64-bit word is provided to both of the standard MAC units 51 and 52, the aforementioned bits received by the standard MAC units 51 and 52 cause the standard MAC units 51 and 52 to select the appropriate 32-bit word. The standard MAC units 51 and 52 then perform their respective operations on these 32-bit words.

As stated above, the standard MAC units 51 and 52 normally process 82-bit words. When processing SIMD words, only the lower 64 bits are utilized by the standard MAC units 51 and 52. The upper 18 bits are set to a constant value and generally are ignored. Once the standard MAC units 51 and 52 have processed their respective portions of the 64-bit SIMD word, the bypass blocks 54 and 55 coalesce the 32-bit results into a 64-bit SIMD result. The bypass blocks 54 and 55 write the lower and upper 32-bit words, respectively, to the register file block 56 by writing the bits to adjacent bit fields in the register file block 56 in such a manner that the 64-bit result written to the register file block 56 is as it would have been if it had been processed by an SIMD MAC unit such as SIMD MAC unit 3 or 4 shown in FIG. 1.

The lines shown in the floating-point unit 50 of FIG. 2 are being used in the same manner in which they were used in FIG. 1 to denote buses. The arrows are being used to indicate the direction of flow of the data and the circles are being used to indicate bus inputs. The lines 61, 62 and 63 represent the lower 32 bits of the SIMD word. Therefore, in SIMD mode, each of the buses 61, 62 and 63 transports a 32-bit operand.(i.e., A, B and C). When the SIMD words are delivered to the floating-point unit 50, the register file block 56 loads the SIMD bits into the appropriate registers of the register file block 56 in accordance with control bits received by the register file block 56. The bypass block 54 selects the lower 32-bit portions of the SIMD words and routes the 32-bit words over buses 61, 62 and 63 from the register file block 56 to the standard MAC unit 51. Simultaneously, the bypass block 55 routes the upper 32-bit portions of the SIMD words over bus lines 65, 66 and 67 to the standard MAC unit 52.

The standard MAC unit 51 and the standard MAC unit 52 simultaneously perform multiply accumulate-operations on their respective portions of the SIMD word. In SIMD mode, the standard MAC units 51 and 52 both produce 32-bit results, which are routed over bus lines 71 and 72, respectively, to the bypass blocks 54 and 55. The results are then coalesced by the bypass blocks 54 and 55 to produce a 64-bit SIMD result, which is then written to the appropriate registers in the register file block 56.

It should be noted that the floating-point unit 1 shown in FIG. 1 is capable of performing two SIMD operations simultaneously to generate four SIMD results, which are in pairs of two. With the floating-point unit 50 shown in FIG. 2, only one SIMD operation is capable of being performed at a time. Therefore, with respect to the performance of SIMD operations, the floating-point unit 50 shown in FIG. 2 generally has half the throughput of the floating-point unit 1 shown in FIG. 1. If SIMD operations were performed frequently, the overall throughput of the floating-point unit 50 would be much less than the overall throughput of the floating-point unit 1. However, SIMD operations typically only represent less than five percent of the total operations performed by floating-point units. Therefore, the decrease in the throughput of the floating-point unit 50 resulting from the performance of SIMD operations in the standard MAC units 51 and 52 is not greatly significant.

Furthermore, the. decrease in throughput of the floating-point unit 50 in comparison to the floating-point unit 1 is deemed justifiable in view of the significant savings in die area realized as a result of the elimination of the dedicated SIMD MAC units 3 and 4 shown in FIG. 1. Furthermore, the floating-point unit 50 is designed to further reduce the effects of the decreased throughput resulting from the elimination of the SIMD MAC units 3 and 4, as discussed below in detail with reference to FIGS. 4 and 5.

Figure 4:
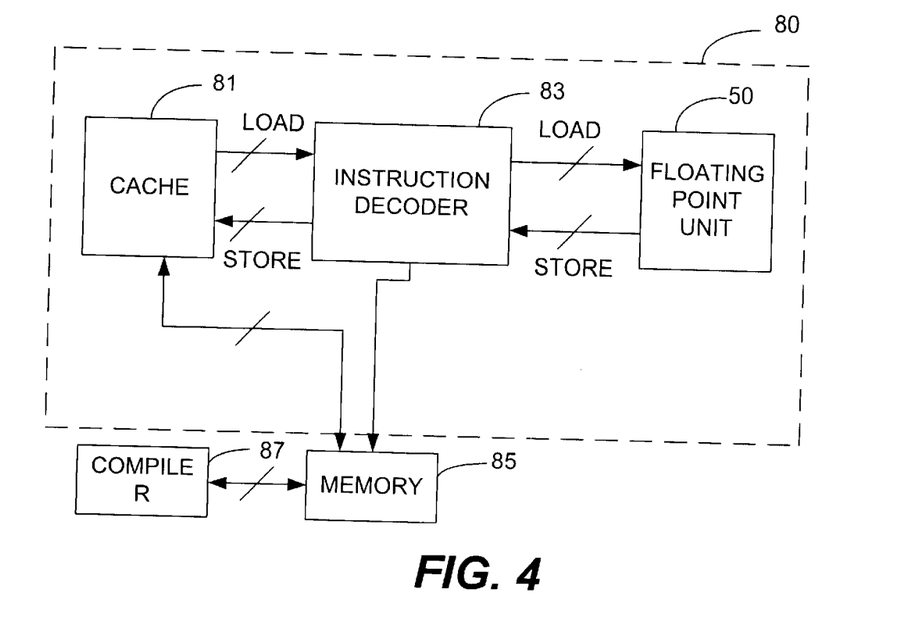
FIG. 4 illustrates a functional block diagram of a portion of the processor architecture of the present invention, which includes the floating-point unit, which will be used to demonstrate the interactions between the floating-point unit and other components of the processor architecture.

FIG. 4 illustrates a circuit 80 of the processor architecture which controls the loading of instructions and data from a cache memory component 81 into the floating-point unit 50 and the storing of data from the floating-point unit 50 and storage of the data in the cache memory component 81. The circuit 80 comprises an instruction decoder 83 which controls the retrieval of data from and storage of data in the cache memory component 81 and the loading of data in and retrieval of data from the floating-point unit 50. The circuit 80 communicates with a memory component 85 which preferably is off-chip which stores instructions and data when they are not residing in the cache memory component 81. Those skilled in the art will understand that the memory component 85 could be an on-chip memory component. However, implementing the memory component 85 on-chip may be expensive in terms of die area, and therefore, preferably is implemented as an off-chip component.

A compiler 87, which is external to the circuit 80 controls which instruction and data are to reside in the cache memory component 81 and which are to reside in memory element 85. As will be understood by those skilled in the art, the compiler 87 typically is a software component which optimizes program execution by utilizing various optimization techniques such as, for example, code reordering. The compiler 87 utilizes these optimization techniques and causes particular pieces of code and data to be moved from memory element 85 into the cache memory component 81, and vice versa.

The instruction decoder 83 reads instructions and data out of the cache memory component 81 and determines the type of operation to be performed on the data. The instruction decoder 83 then causes the data to be loaded into the appropriate registers in the register file block 56 of the floating-point unit 50. The instruction decoder 83 provides control bits to the floating-point unit 50 which instruct the register file block 56 of the registers in which the data is to be stored and of the manner in which the data stored in those registers is to be processed. The instruction decoder 83 causes the floating-point unit 50 to store the data after it has been processed and provides it either to the memory element 85 or to the cache memory component 81. The instruction decoder 83 utilizes information from the compiler 87 to determine whether the data is to be stored in the memory element 85 or in the cache component 81.

Figure 5:
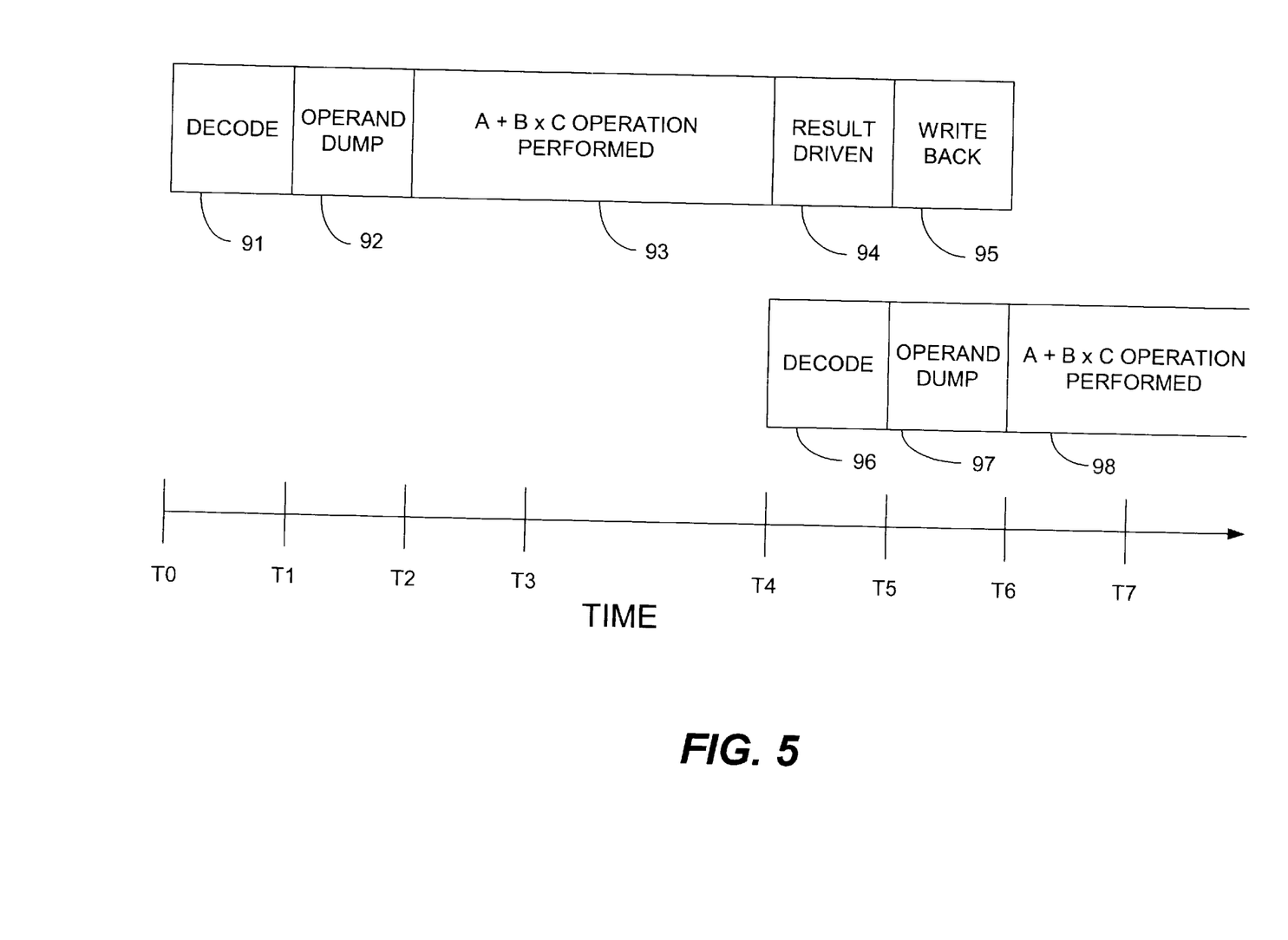
FIG. 5 is a timing diagram illustrating the timing of certain operations occurring in the floating-point unit of FIG. 2.

FIG. 5 illustrates a high-level timing diagram of the performance of a SIMD operation from the point at which the instruction decoder 83 decodes a SIMD instruction to the point at which the coalesced 64-bit SIMD result has been written back to a register in the register file block 56. It should be noted that the time periods T0 through T7 do not necessarily represent cycles occurring in the processor architecture, but are merely intended to demonstrate the relative timing of the performance of various tasks with respect to one another. The floating-point unit 50 and the instruction decoder 83 are designed so that they maximize the speed at which operations are performed.

A SIMD operation begins when the instruction decoder 83 decodes an instruction read out of cache memory component 81 and determines which registers in the register file block 56 are to be used as the operands in a SIMD operation. This step is indicated by block 91 in the timing diagram of FIG. 5. This decode step, which is represented by block 91, occurs in a first unit of time T0 to T1. In a second time period T1 to T2, the instruction decoder 83 causes the operands of the SIMD word to be dumped from the appropriate registers in the register file block 56. The operand dump step is represented by block 92.

During the period of time from T2 to T3, the SIMD word is split into a lower portion and an upper portion, the lower and upper portions are provided by the bypass block 54 and 55 to the standard MAC units 51 and 52, respectively, and the arithmetic operation is performed in the standard MAC units 51 and 52. This sequence of steps is represented by block 93. During the time period from T4 to T5, the SIMD results 71 and 72 (FIG. 2) are driven by the standard MAC units 51 and 52 to the bypass blocks 54 and 55. During the time period from T5 to T6, the results 71 and 72 are coalesced in the bypass blocks 54 and 55 into a single 64-bit SIMD result and the 64-bit SIMD result is written to the appropriate register in the register file block 56.

As stated above, in certain cases, the floating-point unit 50 must wait for the results of an operation to be written back to the appropriate register in the register file block 56 before the floating-point unit 50 can begin performing a subsequent operation. For example, in a first operation to be performed by the floating-point unit 50, the operands A, B and C may be stored in registers R4, R6 and R8, respectively, and the results of the operation are to be stored in register R11. A second operation must utilize the contents of registers R11, R14 and R19 for performing an operation for which the results will be stored in register R60. In this case, the floating-point unit 50 must wait until the results of the first operation have been written to register R11 before it can begin performing the second operation, since the contents of register R11 must be utilized in the second operation.

Conversely, if the floating-point unit 50 does not need to wait for the results of a previous operation before performing the next operation, the floating-point unit 50 can launch the second operation by as early as time T1 because the standard MAC units 51 and 52 employ pipeline designs.

When the results of the previous operation are written back to the register file block 56, the decode step 96 of the second operation can begin. Therefore, the decode step 96 can begin before the write-back step 95 occurs in the previous operation. The operand dump step 97 of the second operation will occur during the write-back step 95 of the previous operation so that the results of the previous operation and operands for the next operation will be available at the same time for the processing steps of block 98.

The instruction decoder 83 keeps track of these types of operation dependencies and launches instructions at the appropriate times such that throughput of the floating-point unit 50 is maximized while preserving the integrity of the data of the operations to be performed by the floating-point unit 50. Therefore, although the floating-point unit 50 incurs a performance penalty by not utilizing dedicated SIMD MAC units, the significance of this performance penalty is minimized while realizing significant savings in terms of the amount of die area required for implementation of the floating-point unit 50.

It will be understood by those skilled in the art that the present invention has been described with respect to the preferred embodiment and that the present invention is not limited to this embodiment. Those skilled in the art will also realize that modifications can be made to the embodiment described above which are within the scope of the present invention. Also, those skilled in the art will understand that certain components of the present invention which have been discussed as being implemented solely in hardware may be implemented in hardware, software or a combination of hardware and software. Those skilled in the art will also understand that although the present invention has been discussed with reference to particular data type formats and bit word lengths, that the present invention is not limited to any particular data type formats or bit word lengths and that the concepts of the present invention can be applied to a variety of data type formats and bit word lengths.

What is claimed is:

1. A floating-point unit for performing arithmetic operations on data, the floating-point unit comprising:

a register file configured to store and read data;

a first multiply accumulate unit configured to perform arithmetic operations on a plurality of data type formats;

a second multiply accumulate unit configured to perform arithmetic operations on a plurality of data type formats;

a first bypass component configured to receive data from the register file and to transmit the data to the first multiply accumulate unit, the first bypass component further configured to receive results of arithmetic operations performed by the first multiply accumulate unit and to transmit the results from the first multiply accumulate unit to the register file; and a second bypass component configured to receive data from the register file and to transmit the data received by the second bypass component to the second multiply accumulate unit, the second bypass component further configured to receive results of arithmetic operations performed by the second multiply accumulate unit and to transmit the results of the arithmetic operations performed by the second multiply accumulate unit to the register file, wherein each of the multiply accumulate units receives a 64-bit word and wherein the first multiply accumulate unit selects the upper 32 bits of the 64-bit word to operate on and wherein the second multiply accumulate unit selects the lower 32 bits of the 64-bit word to operate on and wherein each of the multiply accumulate units is provided with one or more bits which the multiply accumulate units use to determine which 32-bit portions of the 64-bit word are to be operated on by the respective multiply accumulate unit.

2. The apparatus of claim 1, wherein a first data type format which can be operated on by the multiply accumulate units is an 82-bit word, the 82-bit word comprising a 64-bit mantissa value, a 17-bit exponent value and a one-bit sign value, and wherein a second data type format which can be operated on by the multiply accumulate units is comprised of two 32-bit words, each 32-bit word comprising a 23-bit mantissa value, an 8-bit exponent value, and a one-bit sign value.

3. The apparatus of claim 2, wherein the results produced in the first multiply accumulate unit and the results produced in the second multiply accumulate unit are coalesced by the bypass components in the register file to thereby generate a 64-bit word which is stored in one or more registers in the register file.

4. The apparatus of claim 3, wherein three operand buses transport the 32-bit words from the register file to the first multiply accumulate unit, each bus being capable of transporting a 32-bit operand, and wherein three 32-bit buses transport data from the register file to the second multiply accumulate unit, each bus being capable of transporting a 32-bit operand from the register file to the second multiply accumulate unit, and wherein a 32-bit bus transports operation results from the first multiply accumulate unit to the register file, and wherein a 32-bit bus transports operation results from the second multiply accumulate unit to the register file and wherein the 32-bit results transported on the 32-bit buses from the first and second multiply accumulate units to the register file are coalesced and stored as a 64-bit word in one or more registers of the register file.

5. The apparatus of claim 4, wherein the three 32-bit buses that transport data from the register file to the first multiply accumulate unit are connected to the first bypass component, and wherein the three 32-bit buses that transport data from the register file to the second multiply accumulate unit are connected to the second bypass component, and wherein one or more control bits provided to the first and second bypass components are used by the first and second bypass components to cause data stored in particular registers in the register file to be output onto the 32-bit operand buses when the data is to be transported from the register file to the first and second multiply accumulate units, and wherein one or more control bits delivered to the first and second bypass components are utilized by the first and second bypass components to cause data being transported from the multiply accumulate units to the register file to be stored in one or more particular registers in the register file.

6. The apparatus of claim 5, wherein the bus that transports operation results from the first multiply accumulate unit to the register file block is connected to the first and second bypass components, and wherein the bus that transports operation results from the second multiply accumulate unit to the register file is connected to the first and second bypass components, and wherein the bus for transporting the operation results from the first multiply accumulate unit to the register file block is connected to the first bypass component and to the register file to enable the operation results to be transported from the first bypass component to the register file, and wherein the bus that transports operation results from the second multiply accumulate unit to the register file is connected to the second bypass component and to the register file to enable operation results to be transported from the second bypass component to the register file.

7. The apparatus of claim 6, wherein each of the multiply accumulate units comprises one 82-bit adder and one 82-bit multiplier, and wherein each multiply accumulate unit utilizes the 82-bit adder and the 82-bit multiplier comprised therein to perform operations on the 32-bit operands transported from the register file to the multiply accumulate units.

8. The apparatus of claim 7, wherein each multiply accumulate unit performs an arithmetic operation defined by $A+B \times C$, wherein A, B and C each correspond to one of the 32-bit operands transported from the register file to one of the multiply accumulate units, wherein the multipliers comprised in the multiply accumulate units operate on the operands B and C and wherein the adders comprised in the multiply accumulate units operate on the operand A and the results from the multipliers to produce the operation results, each of the operation results generated in the first and second multiply accumulate units comprising 32 bits and wherein the bypass components operate in conjunction with each other to coalesce the 32-bit operation results into a single 64-bit operation result and wherein the first and second multiply accumulate units coalesce the operation results in one or more registers in the register file.

9. An apparatus for performing arithmetic operations on single instruction multiple data (SIMD) in a floating-point unit, the apparatus comprising:

first means for performing multiply accumulate operations defined by an equation $A+B \times C$, where A, B and C are operands;

second means for performing multiply accumulate operations defined by an equation $A+B \times C$, where A, B and C are operands;

means for providing a data word, comprising a first and second operand, to the first means for performing multiply accumulate operations;

means for providing the data word to the second means for performing multiply accumulate operations;

means for selecting, in the first and second means for performing multiply accumulate operations, one of the operands, the operand selected by the first means for performing multiply accumulate operations being different than the operand selected by the second means for performing multiply accumulate operations, wherein said first means for performing multiply accumulate operations performs arithmetic operations on the operand selected by the first means for performing multiply accumulate operations, and wherein said second means for performing multiply accumulate operations performs arithmetic operations on the operand selected by the second means for performing multiply accumulate operations; and means for coalescing results of the operations performed in the first and second means for performing multiply accumulate operations into a single SIMD result word, wherein the data word provided to the first and second means for performing multiply accumulate operations is a 64-bit word, the 64-bit word comprising two 32-bit words, each 32-bit word comprising a 23-bit mantissa value, an 8-bit exponent value, and a one-bit sign value, wherein the means for selecting in the first means for performing multiply accumulate operations selects the upper 32-bit word of the 64-bit word, and wherein the means for selecting in the second means for performing multiply accumulate operations selects the lower 32-bit word of the 64-bit word, and wherein the results of the operations performed in the first and second means for performing multiply accumulate operations are coalesced into a 64-bit word, the coalesced 64-bit word comprising two 32-bit words, each 32-bit word of the coalesced 64-bit word comprising a 23-bit mantissa value, an 8-bit exponent value, and a one-bit sign value.

10. A method for performing arithmetic operations on single instruction multiple data (SIMD) in a floating-point unit, the floating-point unit comprising first and second multiply accumulate units, the method comprising the steps of:

providing a data word to the first multiply accumulate unit, the data word provided to the first multiply accumulate unit comprising a first operand and a second operand;

providing the data word to a second multiply accumulate unit, the data word provided to the second multiply accumulate unit comprising the first and second operands;

selecting, in the first multiply accumulate unit, one of the first and second operands;

selecting, in the second multiply accumulate unit, one of the first and second operands, the operand selected by the second multiply accumulate unit being different from the operand selected by the first multiply accumulate unit;

concurrently performing a multiply accumulate operation in the first multiply accumulate unit on the operand selected by the first multiply accumulate unit and a multiply accumulate operation in the second multiply accumulate unit on the operand selected by the second multiply accumulate unit; and coalescing the result of the operations performed in the first and second multiply accumulate units into a single SIMD result word.

11. The method of claim 10, wherein the data word provided to the first and second multiply accumulate units is a 64-bit word, each 64-bit word comprising two 32-bit words, each 32-bit word comprising a 23-bit mantissa value, an 8-bit exponent value, and a one-bit sign value, wherein the first multiply accumulate unit selects the upper 32-bit word of the 64-bit word and wherein the second multiply accumulate unit selects the lower 32-bit word of the 64-bit word, and wherein the results of the operations performed by the first and second multiply accumulate units are coalesced into 64-bit words, each coalesced 65-bit word comprising two 32-bit words, each 32-bit word comprising a 23-bit mantissa value, an 8-bit exponent value, and a one-bit sign value.

12. The method of claim 11, wherein each of the multiply accumulate units comprises one 82-bit adder and one 82-bit multiplier, and wherein each multiply accumulate unit utilizes the 82-bit adder and the 82-bit multiplier comprised therein to perform operations on the 32-bit words.

13. The method of claim 12, wherein each multiply accumulate unit performs an arithmetic operation defined by A+B×C, wherein A, B and C each correspond to one of the 32-bit operands operated on by the multiply accumulate units, wherein the multipliers comprised in the multiply accumulate units operate on the operands B and C and wherein the adders comprised in the multiply accumulate units operate on the operand A and the results from the multipliers to produce the results that are subsequently coalesced, wherein the coalesced results are stored in one or more registers in a register file of the floating-point unit.

14. A system for performing floating point operations, comprising:

a register file comprising a plurality of registers;

a first multiply accumulate unit configured to perform arithmetic operations on a plurality of data type formats;

a second multiply accumulate unit configured to perform arithmetic operations on a plurality of data type formats; and a bypass unit coupled to the first and second multiply accumulate units and to the register file, the bypass unit configured to receive a data word from one of the registers, the data word comprising a first operand and a second operand, the bypass unit further configured to pass the data word, including both the first and second operands, to each of the multiply accumulate units, the bypass unit configured to receive results of arithmetic operations performed by the first and second accumulate units and to coalesce the results into a combined result and to pass the combined result to the register file, wherein each of the first and second multiply accumulate units is configured to select and operate on a different one of the operands.

15. The system of claim 14, wherein each of the first and second multiply accumulate units is configured to determine which of the operands to select and operate on based on one or more bits provided to the first and second multiply accumulate units.

16. A method for performing floating point operations, comprising the steps of:

receiving, by a bypass unit, a data word comprising a first operand and a second operand;

passing the data word, including both the first and second operands, to each of a first multiply accumulate unit and a second multiply a selecting and operating on a different one of the operands by each of the first and second multiply accumulate units to produce results of arithmetic operations performed by the first and second multiply accumulate units; passing the results to the bypass unit;

coalescing the results into a combined result; and passing the combined result to a register file.

\* \* \* \* \*